United States Patent [19]

Moore et al.

[11] 3,993,118

[45] Nov. 23, 1976

[54] ADJUSTABLE GUIDE FOR CONTINUOUS CASTING BAND

[75] Inventors: John B. Moore; William F. Prater, both of Carrollton, Ga.

[73] Assignee: Southwire Company, Carrollton, Ga.

[22] Filed: Sept. 12, 1975

[21] Appl. No.: 612,704

[52] U.S. Cl. .................................. 164/278; 74/240; 83/820
[51] Int. Cl.² ...................... B22D 11/06; F16H 7/18
[58] Field of Search ..................... 164/278, 276, 87; 83/820, 825, 829; 74/240

[56] References Cited
UNITED STATES PATENTS

| | | | |
|---|---|---|---|
| 451,199 | 4/1891 | Kesseler | 83/820 X |
| 535,383 | 3/1895 | Long | 83/825 |
| 752,202 | 2/1904 | Chritton | 74/240 |
| 2,250,324 | 7/1941 | Baker | 83/825 |
| 3,811,492 | 5/1974 | Ward | 164/87 X |

*Primary Examiner*—Leonidas Vlachos
*Assistant Examiner*—Horace M. Culver
*Attorney, Agent, or Firm*—Van C. Wilks; Herbert M. Hanegan; Stanley L. Tate

[57] ABSTRACT

This disclosure relates to a wheel-band type continuous casting machine wherein the endless flexible band is guided about the rotatably mounted casting wheel by means of a plurality of flangeless guide wheels, and is restrained from movement in a direction parallel to the axis of rotation of the casting wheel by means of band guides adapted to engage opposite edges of the endless band. The band guides comprise a plurality of rollers rotatably mounted adjacent the edges of the band with their axes of rotation arranged perpendicular to the direction of band movement therepast whereby the rollers are adapted to engage the edges of the band in rolling point contact. Means are provided for adjusting the position of the band guides with respect to the bands.

7 Claims, 5 Drawing Figures

ADJUSTABLE GUIDE FOR CONTINUOUS CASTING BAND

BACKGROUND OF THE INVENTION

This invention relates to the metal forming arts, and more particularly to apparatus for the continuous casting of molten metals such as copper, aluminum and alloys thereof.

In wheel-band type continuous casting machines the casting mold is defined between a peripheral groove formed in the casting wheel and an endless flexible band which closes the groove along a portion of its length. In conventional wheel-band type continuous casting machines the band is guided about the casting wheel by a plurality of guide wheels mounted adjacent the casting wheel. The guide wheels are provided with annular flanges which prevent the band from slipping off the guide wheels and assist in restraining the band from deviating from its predetermined path. However, this arrangement has resulted in a great many disadvantages for several years and has restricted the commerical usages of the wheel-band type continuous casting machine. Essentially, the flanges on the guide wheels cause considerable wear and buckling of the edges of the band which, in turn, causes damage to the rim of the casting wheel.

Moreover, in wheel-band type continuous casting machines it is desirable to use a thin band in order to reduce the stresses therein when the band is first flexed in one direction when it passes around the casting wheel and then flexed in the opposite direction when it passes around the guide wheels. Inasmuch as the band is continuously revolving, and therefore repeatedly flexed in one direction and then in the other, the flexural stresses would be reduced and the band life greatly extended by using a thin band. However, because of the necessity in conventional wheel-band continuous casting machines to use flanges on the guide wheels to steer the band, it has been found necessary to use a thick casting band. When thin bands were used in such casting machines, maintained under adequate tension to prevent leakage of the molten metal from the casting mold, the band would rapidly wear along its edges where it contacted the guide flanges. Furthermore, the band has a tendency to climb the flanges as it enters the guide wheels, thus resulting in distortion and tearing of the edges of the band.

Several attempts have been made by the prior art to provide wheel-band type continuous casting machines having flangeless guide wheels. Generally, in the prior art machines of this type, at least one of the guide wheels would be pivotable about an axis perpendicular to its axis of rotation thus providing for steering of the band and maintaining the band centered on the flat, flangeless surfaces of the guide wheels. Such prior art machines are exemplified in U.S. Pat. No. 3,533,463 issued to R. W. Hazelett, U.S. Pat. No. 3,318,367 issued to T. L. Bray U.S. Pat. No. 3,336,972 issued to D. B. Cofer et al.

However, prior art machines of the aforementioned type are both relatively complicated and expensive, and have not been totally effective in maintaining the band perfectly aligned as it travels about the casting wheel.

SUMMARY OF THE INVENTION

In view of the foregoing, it should be apparent that there is still a need in the art of a wheel-band type continuous casting machine having flangeless guide wheels which is both relatively simple and economical, and at the same time avoids the problems and disadvantages inherent in prior art apparatus of this type. Accordingly, it is a primary object of this invention to provide an apparatus for guiding the casting band in proper alignment about a rotatable casting wheel on guide wheels having flat, cylindrical, uncrowned contact surfaces, without the use of flanges, and at the same time apply adequate tension to the band without creating leakages between the casting band and the casting wheel.

More particularly, it is an object of this invention to provide a wheel-band type continuous casting machine wherein means are provided independent of the guide wheels for restraining movement of the band in at least direction parallel to the axis of rotation of the casting wheel.

Another object of this invention is to provide a continuous casting machine of the aforementioned type which enables the use of very thin casting bands thereby yielding the advantages of more effective cooling, decreased band distortion and longer band life.

Briefly described, these and other objects of the invention that may become more apparent hereinafter are accomplished by providing band guides located at critical points along the path of band travel where the band is most likely to deviate, in a direction parallel to the axis of the casting wheel, from its predetermined path. The band guides include at least one roller adapted to engage one edge of the band with its axis of rotation arranged perpendicular to the direction of band movement whereby the at least one roller is adapted to engage the one edge of the band in rolling point contact. It should be apparent that the rolling point contact provides significantly less friction against the edge of the band than is provided by the line contact of the band edge against the flange of a prior art guide wheel.

In some casting machines only one edge of the band need be guided; however, in larger casting machines both edges of the band are preferably guided by means of guide rollers disposed on generally diametrically opposite sides of the casting wheel.

In a preferred embodiment of the invention the band guide is mounted on the pivot arm of the mold inlet presser wheel and thus will be maintained in fixed relation to the band regardless of the position of the presser wheel.

Preferably, the band guides will comprise a plurality of rollers arranged in a chain link mounted in a movable frame, the position of which in relation to the band edge may be adjusted by easily-reached adjusting means which may be actuated during an actual casting operation.

With the above and other objects in view that may become hereinafter apparent, the nature of the invention will be more clearly understood by reference to the attached drawings, the following detailed description thereof, and the appended claimed subject matter.

In The Drawings

DETAILED DESCRIPTION OF THE PREFERRED EMBODIMENT

Figure 1:
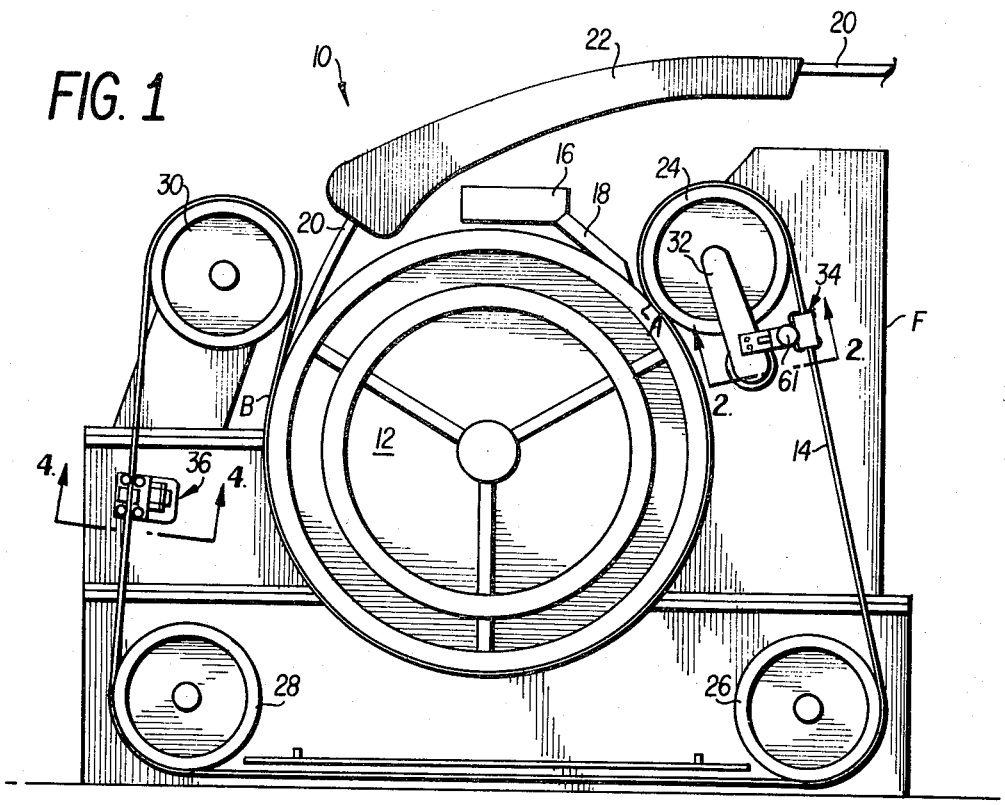
FIG. 1 is a schematic elevation view of a wheel-band type continuous casting machine constructed in accordance with this invention, and illustrates band guides mounted on the pivot arm of the mold inlet presser wheel as well as near the exit guide wheel.

Referring now to the drawings in detail, there is illustrated in FIG. 1 a wheel-band type continuous casting machine designated generally by the numeral 10. The casting machine 10 includes a rotatable casting wheel 12 which includes a peripheral groove (not shown) which is closed along a portion of its length by an endless flexible band 14. The band 14 first contacts the casting wheel 12 at point A and leaves the surface of the wheel 12 at point B, defining a casting mold therebetween. Molten metal contained in a tundish 16 is poured through spout 18 into the inlet A of the casting mold. The molten metal is cooled in the casting wheel 12 and exits therefrom at point B in the form of a cast bar 20. The cast bar 20 is conveyed over an outlet guide 22 from whence it is conveyed for further processing.

The band 14 is guided about the casting wheel 12 by a plurality of guide wheels 24, 26, 28 and 30 which are rotatably mounted on a frame F. The guide wheel 24 is an inlet guide presser wheel which is pivotably mounted on a pivot arm 32 for movement toward and away from the periphery of the casting wheel 12. By manipulation of the pivot arm 32 the position of the inlet point A can be varied.

Unlike the guide wheels of prior art casting machines, the guide wheels 24 – 30 of the casting machine 10 are flangeless. However, in order to prevent the flexible band 14 from slipping off the guide wheels 24 – 30 in a direction parallel to the axis of rotation of the casting wheel 12, there is provided in accordance with this invention an inlet side band guide 34 and an outlet side band guide 36.

Figure 2:
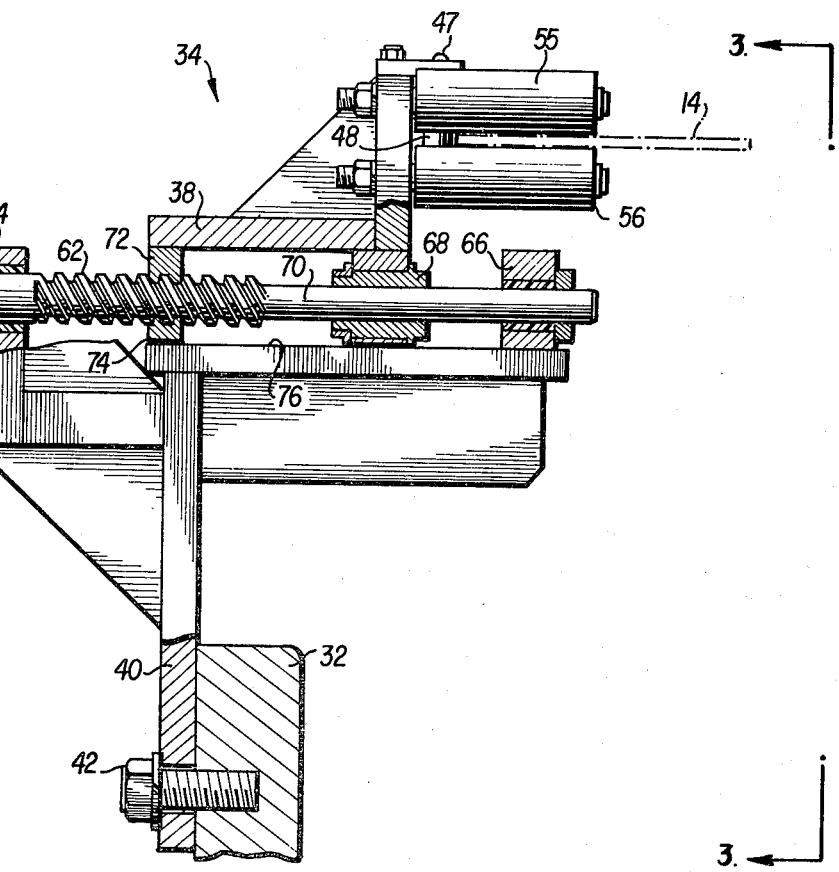
FIG. 2 is an enlarged elevation view taken along line 2—2 of FIG. 1, and has portions thereof cut away for clarity to illustrate portions of one of the guides constructed in accordance with this invention.

As seen most clearly in FIG. 2 the band guide 34, includes a frame 38 carried by a mounting plate 40 which is suitably secured to the pivot arm 32 by means of bolts 42.

Figure 3:
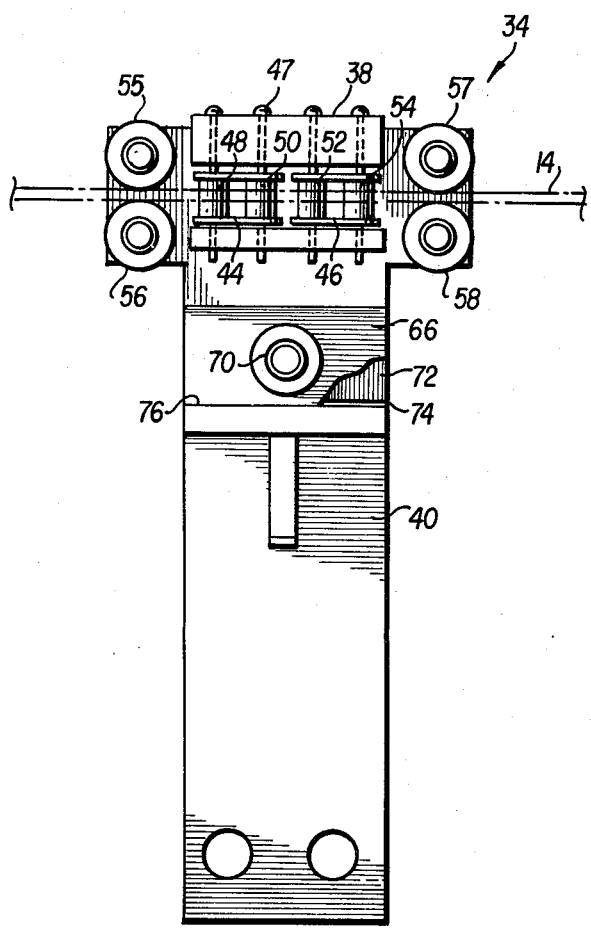
FIG. 3 is an elevation view taken along line 3—3 of FIG. 2, and illustrates the chain-link rollers of the band guide, the band being illustrated in phantom.
Figure 4:
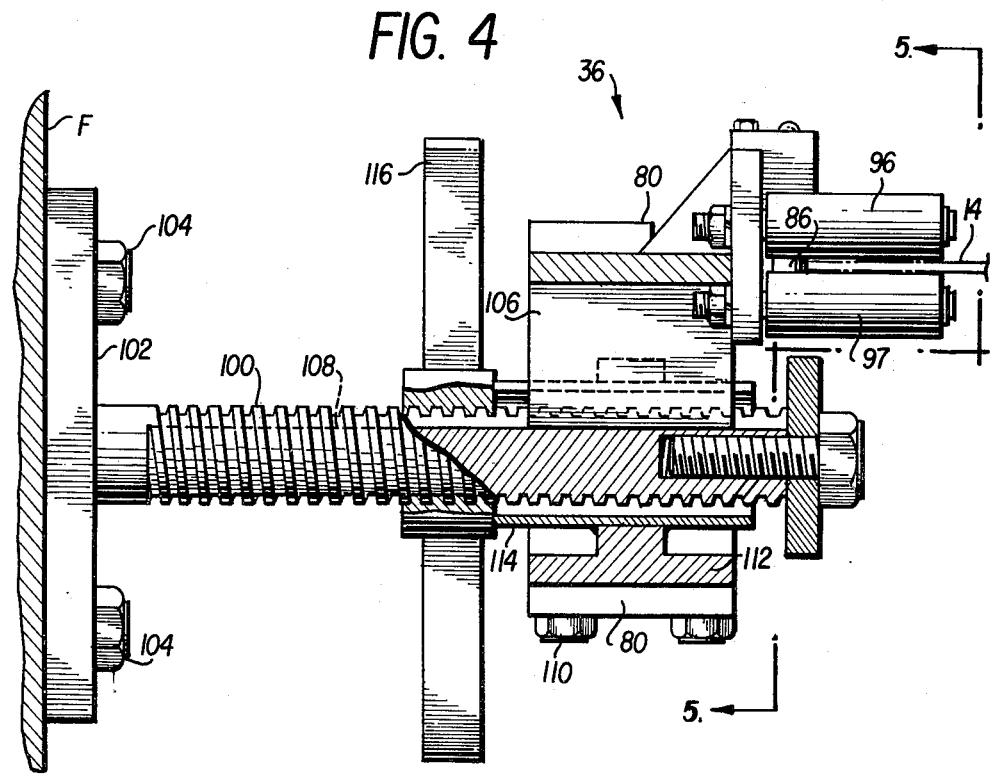
FIG. 4 is an enlarged elevation view taken along line 4—4 of FIG. 1, and has portions thereof cut away for clarity to illustrate portions of the other band guide.
Figure 5:
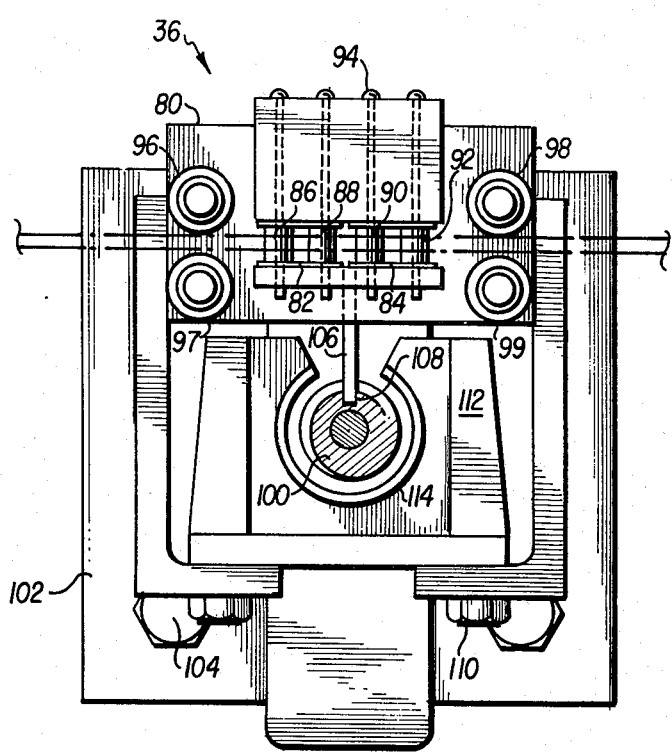
FIG. 5 is a sectional view taken along lines 5—5 of FIG. 4, and illustrates further details of the adjusting means for this guide.

Referring now particularly to FIG. 3, it can be seen that mounted within the frame 38 of the band guide 34 are chain links 44, 46 having rollers 48, 50, 52 and 54, respectively, mounted therein by means of pins 47. The rollers 48–54 are adapted to engage against one edge of the band 14 (illustrated in phantom) in rolling line contact. Also mounted in the frame 38 are rollers 55, 56 and 57, 58 which are adapted to engage the opposite faces of the band 14 and thus guide the band through the housing 38 where one edge thereof is engaged by the rollers 48–54.

Referring once again to FIG. 2, it can be seen that the band guide 34 is adjustable relative to the edge of the band 14 by means of an adjusting screw 60 having threads 62 formed thereon. The screw 60 is suitably journalled in bearings 64, 66 carried by the support plate 40.

The frame 38 of the band guide 34 carries a bushing 68 which is slidably mounted on an unthreaded portion 70 of the screw 60. The frame 38 also carries a nut 72 which is threadedly engaged with the thread 62 of the screw 60. Since the nut 72 includes an edge face 74 which slidingly abuts against a flat table surface 76 of the plate 40, the nut 72 will be restrained against rotation and thus effect translation of the frame 38 when the adjusting screw 60 is rotated. Accordingly, the band guide 34 may be finely adjusted relative to the edge of the band 14.

The outlet side band guide 36 is similar to the inlet side band guide 34 to the extent that it includes a frame 80 in which is mounted chain links 82 and 84 having rollers 86, 88, 90 and 92 mounted therein by means of pins 94 for engaging the edge of the band 14 opposite from the edge engaged by the rollers 48-54 of the band guide 34. Additionally, the frame 80 carries rollers 96, 97 and 98, 99 for engaging the opposite faces of the band 14 and guiding it through the band guide 36.

The band guide 36 is movably mounted on a slotted threaded shaft 100 extending from a mounting plate 102 suitably fastened to the frame F by means of bolts 104. The frame 80 of the band guide 36 includes a guide plate 106 which is slidably received in a longitudinal slot 108 formed in the shaft 100. The frame 80 is suitably secured by means of bolts 110 to a generally U-shaped bracket 112 which, in turn, carries a slotted tube 114 which surrounds the slotted shaft 100.

The edge of the tube 114 provides an abutment for an adjusting flange 116 which is threadedly engaged with the threaded shaft 100. It should be apparent, therefore, that rotation of the adjusting flange 116 will cause the same to press against the tube 114 and thus cause the plate 106 of the frame 80 to slide in the slot 108 of the shaft 100. Accordingly, the position of the band guide 36 may be adjusted relative to the edge of the band 14.

In the operation of the preferred embodiment of the invention specifically illustrated and described herein, wherein there is provided the two band guides 34 and 36, the inlet side band guide 34 is adapted to engage the front edge (as viewed in FIG. 1) of the band 14, and the outlet side band guide 36 is adapted to engage the back edge of the band 14. Consequently, the band 14 is restrained against movement in both directions parallel to the axis of the casting wheel 12. The rollers 55–58 and 96–99, which engage the opposite faces of the band 14, simultaneously prevent buckling of the band 14 in directions perpendicular to the axis of the casting wheel 14 as it passes through the guides 34, 36 and the edges thereof are engaged by the rollers 48–54 and 86–92, respectively.

Adjustment of the guides 34, 36 relative to the respective edges of the band 14 can be easily accomplished, even during a casting operation, by manipulation of the adjusting flange 116, which effects movement of the guide 36, and an adjustment knob 61 provided on the screw 60, accessible from the front of the casting machine 10, which effects movement of the guide 34.

The band guides 34, 36 are mounted on the casting machine 10 in such a manner that the band 14 can be easily removed and replaced. The guides 34, 36 are well lubricated owing to the abundance of lubricants used during a casting operation and which are carried on the surface of the band 14. The parts of the guides 34, 36 which are subject to the greatest wear are inexpensive and may be easily and quickly replaced, even during a casting operation.

Although there is specifically illustrated herein two guides 34, 36, it should be understood that it is contemplated that either a greater or lesser number of guides may be utilized within the scope of the invention, and further that the location of the band guides may be varied in accordance with the number and location of the band guide wheels and the points of critical band deflection associated therewith.

In view of the foregoing, it should be apparent that there is provided in accordance with this invention a novel band guide for a continuous casting machine which permits the use of flangeless guide wheels, thus increasing the life of the band, while being less expensive and more reliable than prior art systems of this type.

Although only a preferred embodiment of the invention has been specifically illustrated and described herein, it is to be understood that minor modifications could be made therein without departing from the spirit of the invention.

What is claimed is:

1. A wheel-band type continuous casting machine comprising a rotatably mounted casting wheel having a peripheral groove closed along a portion of its length by an endless flexible band having two faces and two edges, the portion of said groove closed by said band defining a casting mold, a plurality of guide wheels mounted adjacent said casting wheel for guiding said band therearound, said guide wheels including a mold inlet presser wheel rotatably mounted on a pivot arm for movement toward and away from the periphery of said casting wheel, first means independent of said presser wheel carried by said pivot arm and engageable with one edge of said band for restraining movement of said band in one direction parallel to the axis of rotation of said casting wheel, and second means not carried by said pivot arm engageable with the other edge of said band for restraining movement of said band in the other direction parallel to the axis of rotation of said casting wheel.

2. Apparatus as defined in claim 1 wherein said restraining means include at least one roller rotatably mounted adjacent at least one of said edges of said band with its axis of rotation arranged perpendicular to the direction of band movement therepast whereby said at least one roller is adapted to engage said at least one edge in rolling point contact.

3. Apparatus as defined in claim 2 wherein said restraining means include a plurality of rollers arranged in a chain link.

4. Apparatus as defined in claim 1 wherein at least one of said restraining means are mounted on a support frame movable in a direction transverse to said band, and means for adjusting the position of said restraining means relative to said band.

5. Apparatus as defined in claim 4 wherein said adjusting means include a rotatable adjusting screw having thread means cooperable with complementary thread means carried by such support frame.

6. Apparatus as defined in claim 4, further including guide roller means mounted in said support frame and engageable with the faces of said band while said restraining means engage said edges of said band.

7. Apparatus as defined in claim 1 wherein said first and second restraining means are mounted in relation to said band on generally diametrically opposite sides of said casting wheel.

* * * * *